(12) United States Patent
Sher et al.

(10) Patent No.: US 8,238,494 B2
(45) Date of Patent: *Aug. 7, 2012

(54) APPARATUS AND METHOD FOR RF PACKET DETECTION AND SYMBOL TIMING RECOVERY

(75) Inventors: Phillip M. Sher, Derry, NH (US); Sriram Krishnan, Emakulam (IN); Colm J. Prendergast, Cambridge, MA (US); Edmund J. Balboni, Littleton, MA (US); Daniel E. Fague, Andover, MA (US); Jeffrey R. Feigin, Woburn, MA (US); Thomas J. Liptay, Cambridge, MA (US)

(73) Assignee: MediaTek, Inc., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/264,403

(22) Filed: Nov. 4, 2008

(65) Prior Publication Data

US 2009/0060104 A1 Mar. 5, 2009

Related U.S. Application Data

(63) Continuation of application No. 10/792,115, filed on Mar. 2, 2004, now Pat. No. 7,457,378.

(51) Int. Cl.
*H04L 27/08* (2006.01)
(52) U.S. Cl. ...................................................... 375/345
(58) Field of Classification Search .................. 375/316, 375/324, 326, 340, 345
See application file for complete search history.

(56) References Cited

U.S. PATENT DOCUMENTS

| 5,416,524 A | 5/1995 | Citta et al. |
| 5,663,715 A * | 9/1997 | Godoroia .................... 340/825.2 |
| 5,875,188 A * | 2/1999 | Dawe ............................ 370/360 |
| 6,292,051 B1* | 9/2001 | Su et al. ......................... 329/313 |
| 7,149,265 B2* | 12/2006 | Wang et al. .................... 375/354 |
| 7,457,378 B1* | 11/2008 | Sher et al. ...................... 375/345 |
| 2003/0162518 A1* | 8/2003 | Baldwin et al. ............. 455/253.2 |
| 2004/0146122 A1* | 7/2004 | Fague et al. .................... 375/326 |

OTHER PUBLICATIONS

"Specification of the Bluetooth System", Promoter Members of Bluetooth Sig., Inc., vol. 1, Version 1.1, Feb. 22, 2001, pp. 1-31.

* cited by examiner

*Primary Examiner* — Kevin M Burd
(74) *Attorney, Agent, or Firm* — Fish & Richardson P.C.

(57) ABSTRACT

A radio frequency (RF) receiver having an analog gain control section for controlling the gain of a received RF signal, and a digital demodulator section for demodulating the output of the gain control section, includes an analog GO circuit connected to recognize the presence of a data packet within a received RF signal in the analog gain control section, and in response to produce an analog GO signal, a digital GO circuit connected to recognize the presence of a data packet within the received RF signal from the digital demodulator section, and in response to produce a digital GO signal, and control circuitry connected to enable gain control functions within the analog gain control section and digital demodulator functions within the digital demodulator section in response to respective analog and digital GO signals.

43 Claims, 5 Drawing Sheets

| X (SNR) | M | 1-M | 1-M+X |
|---|---|---|---|
| 7 (17 dB) | 2 | -1 | 6 |
|  | 3 | -2 | 5 |
|  | 4 | -3 | 4 |
| 3.5 (11 dB) | 2 | -4 | 2.5 |
|  | 3 | -2 | 1.5 |
|  | 4 | -3 | 0.5 |
| 2 (6 dB) | 2 | -1 | 1 |
|  | 3 | -2 | 0 |
|  | 4 | -3 | -1 |

RSSI "GO" multiplier vs. SNR

APPARATUS AND METHOD FOR RF PACKET DETECTION AND SYMBOL TIMING RECOVERY

RELATED APPLICATIONS

This application is a continuation of U.S. application Ser. No. 10/792,115, filed Mar. 2, 2004, the contents of which are incorporated herein by reference.

BACKGROUND

1. Field of the Invention

This invention relates to the detection of radio frequency (RF) data packets and symbol timing recovery in such packets, and to the actuation of both digital and analog GO functions in response to detected data packets.

2. Description of the Related Art

The present invention has particular application to the Bluetooth™ wireless technology data communication system, although it is not limited to this technology. The Bluetooth specification, established by the Bluetooth SIG, Inc., integrates well-tested technology with the power-efficiency and low-cost of a compliant radio system to stable links between mobile computers, mobile phones, portable hand-held devices and the like, and connectivity to the Internet.

The Bluetooth receiver includes a received signal strength indicator (RSSI) that senses the signal strength of a received data packet and, in response, governs an automatic gain control function to ensure a constant signal level at the input of an analog-to-digital converter (ADC) that converts the signal to a digital format, in preparation for down conversion to baseband. To avoid overdriving the circuit with too high a gain, it is desirable that the RSSI operate only when a data packet is actually present. Accordingly, it is important that an accurate detection of a received data signal be made. It is also important that this measurement be made very rapidly, since an incoming data packet has only a 4 or 5 bit preamble. The Bluetooth specification calls for a 4 bit preamble of alternating +1's and −1's based upon the polarity of the first bit in the immediately following synchronization word. If the first bit of the synchronization word is a +1, the last bit of the preamble will be a −1, and vice versa. Thus, a total of 5 known bits are present at the beginning of each burst. It would be useful to know when a desired signal is present at the antenna input, so that its power could accurately be determined and the receiver gain set prior to reception of the desired signal's data. Such knowledge of the start of a burst could also be used to simplify other receiver functions.

Complicating the accurate detection of when a desired data packet has been received is the presence of various interferors, including adjacent channel interference (ACI), co-channel interference (CCI) and noise. If the data packet cannot be distinguished from these sources of interference, signal reception will be lost.

Bluetooth systems use an all-digital baseband receiver to recover transmitted symbols. A received analog Bluetooth signal is sampled by the ADC, usually at a sampling rate that is a multiple of the symbol rate. After further processing of the baseband signal, the symbols have to be estimated by using the correct phase of the sampling clock. Bluetooth type systems are designed to be very low cost, requiring signal processing algorithms that are computationally limited, yet efficient.

A correlation scheme that has been used for STR in a receiver that conforms to the Advanced Television Systems Committee, Inc. Vestigal Side Band standard, intended for terrestrial broadcast of high definition television (HDTV), uses a 4-symbol preamble (+1−1+1−1) at the beginning of every line of a frame. Received symbols are cross-correlated with the 4-symbol preamble to estimate the best phase of the receiver clock as the phase that produces a maximum cross-correlation. Since the correlation has a maximum (+4) in only one case, the receiver attempts to adjust the phase of the sampling clock to attain this maximum value. In practice, clock phase adjustment is performed using a phase locked loop (PLL). Bluetooth, however, is a burst type transmission system with only one preamble transmitted per burst, which can be either (+1−1+1−1) or (−1+1−1+1). The use of a PLL to adjust the phase of the clock would add to receiver complexity and increase costs. Furthermore, a PLL implies a continuing input, whereas a Bluetooth transmission employs only one preamble per burst.

SUMMARY OF THE INVENTION

The invention seeks to provide an RF receiver with an improved capability to recognize the presence of a received data packet, and to respond to that recognition with an improved control over the operation of the receiver. In one aspect of the invention, an analog GO circuit recognizes the presence of a data packet within a received RF signal from an analog gain control section of the receiver, and in response produces an analog GO signal. A digital GO circuit recognizes the presence of a data packet within the received RF signal from a digital demodulator within the receiver, and in response produces a digital GO signal. Gain control functions within the analog gain control section, and digital demodulator functions within the digital demodulator, are encoded in response to respective analog and digital GO signals.

In particular embodiments, the digital demodulator functions are enabled in response to both analog and digital GO signals, while the gain control functions are enabled only in response to an analog GO signal. The analog and digital GO circuits recognize the presence of a data packet by sensing the power and energy, respectively, of the RF signal. The analog GO circuit distinguishes a data packet from noise and CCI, while the digital GO circuit distinguishes a data packet from ACI. Both the analog and digital GO circuits can be triggered by comparing a received signal to a delayed version of the signal, with the delayed version amplified for the analog GO, and ACI attenuated by FIR filters for the digital GO.

An STR circuit that can be used in the invention identifies the periodic samples of a received data packet preamble that are spaced by the bit period and most closely match the preamble bits, with the receiver employing a continuation of the identified periodic samples to decode the remainder of the data packet. In a particular embodiment, the STR circuit is enabled in response to the recognition of a received data packet preamble. It cross-correlates successive preamble samples with the bits represented by the samples, and selects the highest absolute value of cross-correlation as the source of samples to decode the remainder of the packet.

These and other features and advantages of the invention will be apparent to those skilled in the art from the following detailed description, taken together with the accompanying drawings.

DETAILED DESCRIPTION OF THE INVENTION

The present invention deals with the recognition of RF data packets to enable analog gain control functions and digital demodulator functions within the receiver, and a related STR system. While it is particularly useful in meeting the Bluetooth specification, it is applicable to RF receivers in general.

Figure 1:
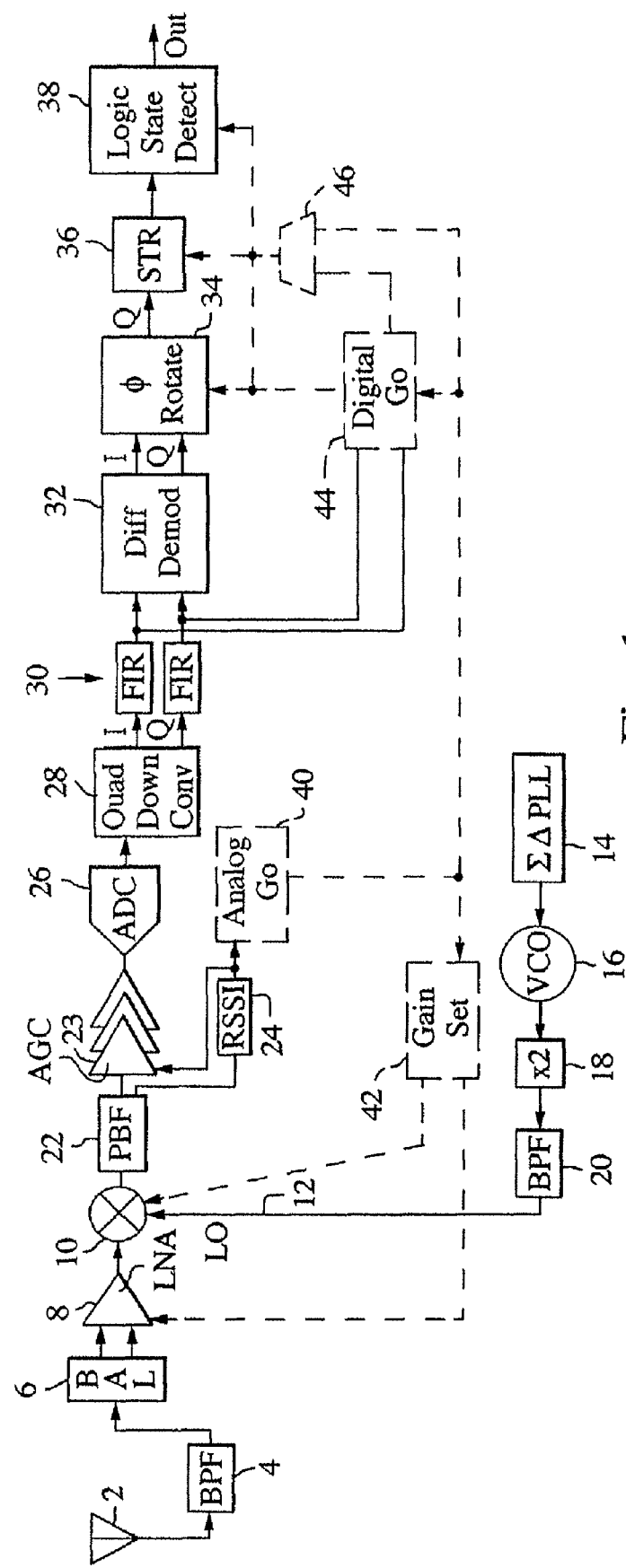
FIG. 1 is a block diagram of a Bluetooth wireless technology receiver system incorporating one embodiment of the invention.

An RF receiver with which the invention can be used is illustrated in FIG. 1, with elements designed in accordance with various embodiments of the invention indicated by dashed lines.

The received signal, consisting of a carrier modulated by an information signal, is delivered by an antenna 2 to a bandpass filter 4, which restricts the signal to a desired band around the carrier frequency. The single-ended output of filter 4 is converted by a balun circuit 6 to a differential signal that is processed by a low noise amplifier 8. ("Balun" is an acronym for "balanced-unbalanced", referring to the single-ended to differential conversion.) The LNA 8 preferably amplifies the signal with up to about 18 dB of gain. The signal is then input to a mixer 10, where it is downconverted to a low intermediate frequency (IF) of typically 2-5 MHz by mixing with a local oscillator (LO) signal on the other mixer input 12; the IF is the difference between the carrier and LO frequencies. The mixer's gain extends to approximately 12 dB in this embodiment. It may also be possible to downconvert the signal directly to baseband at this point.

A possible LO generation circuit comprises a sigma-delta phase locked loop 14, the output of which controls a voltage controlled oscillator (VCO) 16. The VCO output in turn is multiplied by two in multiplier 18 and processed through a bandpass filter 20 to produce the desired LO signal on mixer input 12. A relatively low IF is chosen so that the signal can be digitized and demodulated digitally with a reasonable current budget.

After downconversion, the signal is filtered by a complex polyphase bandpass filter 22, which attenuates all out-of-band and adjacent channels to at least 6 dB below the desired signal level, and then forwarded to a programmable variable gain amplifier (VGA) 23 which provides automatic gain control; its gain is set based upon an RSSI circuit 24. The RSSI circuit ensures a constant signal level at the input of an analog-to-digital converter (ADC) 26 that converts the signal to a digital format. The ADC preferably has 8-bit resolution to provide sufficient dynamic range for both interference margin, and signal-to-noise ratio (SNR) for proper demodulation. It is preferably digitized at 10 Msps.

The digitized output of ADC 26 is downconverted to baseband by a quadrature downconverter 28, which can have the option of a 180° phase shift to invert the spectrum for the case of a high side LO downconversion from the RF. The quadrature downconverter outputs have in-phase I (real) and quadrature Q (imaginary) components. They are sent to a pair of finite impulse response (FIR) low pass filters 30 which provide additional filtering of adjacent channels and also decimate by two, so that the output sample rate is 5 Msps.

The FIR filter outputs are delivered to a differential demodulator 32, which performs a complex differential detection by multiplying the received data stream by a one symbol (bit) delayed, complex conjugate version of itself. The mixer 10, quadrature downconverter 28 and differential demodulator 32, together with the intervening receiver elements, collectively form an extraction circuit that derives a demodulated signal from the received RF signal, based upon the LO signal.

The I and Q outputs of the demodulator 32 are delivered to a phase rotator 34, which compensates for frequency offsets between the carrier and LO signals by rotating the phase of the demodulated signal. The frequency offset compensated output of the phase rotator 34 is delivered to a symbol timing recovery (STR) circuit 36, where the received data's clock is recovered. The output of the phase rotator is also sent to a delay block (not shown) to synchronize the received signal with the STR circuit's output.

The output of the STR circuit 36 is delivered to a logic state detect block 38, which determines whether the received data is a "1" or a "0" by detecting whether it is above or below a predetermined threshold level. Block 38 includes a sample portion in the form of a register that is clocked by the recovered (and possibly delayed) clock from the STR circuit 36. The recovered clock signal samples the received data stream at its maximum amplitude, minimizing the effects of noise. The output of logic state detect block 38 is a "sliced" data bit stream at a 1 Mb/s rate, which constitutes the receiver output.

Figure 7:
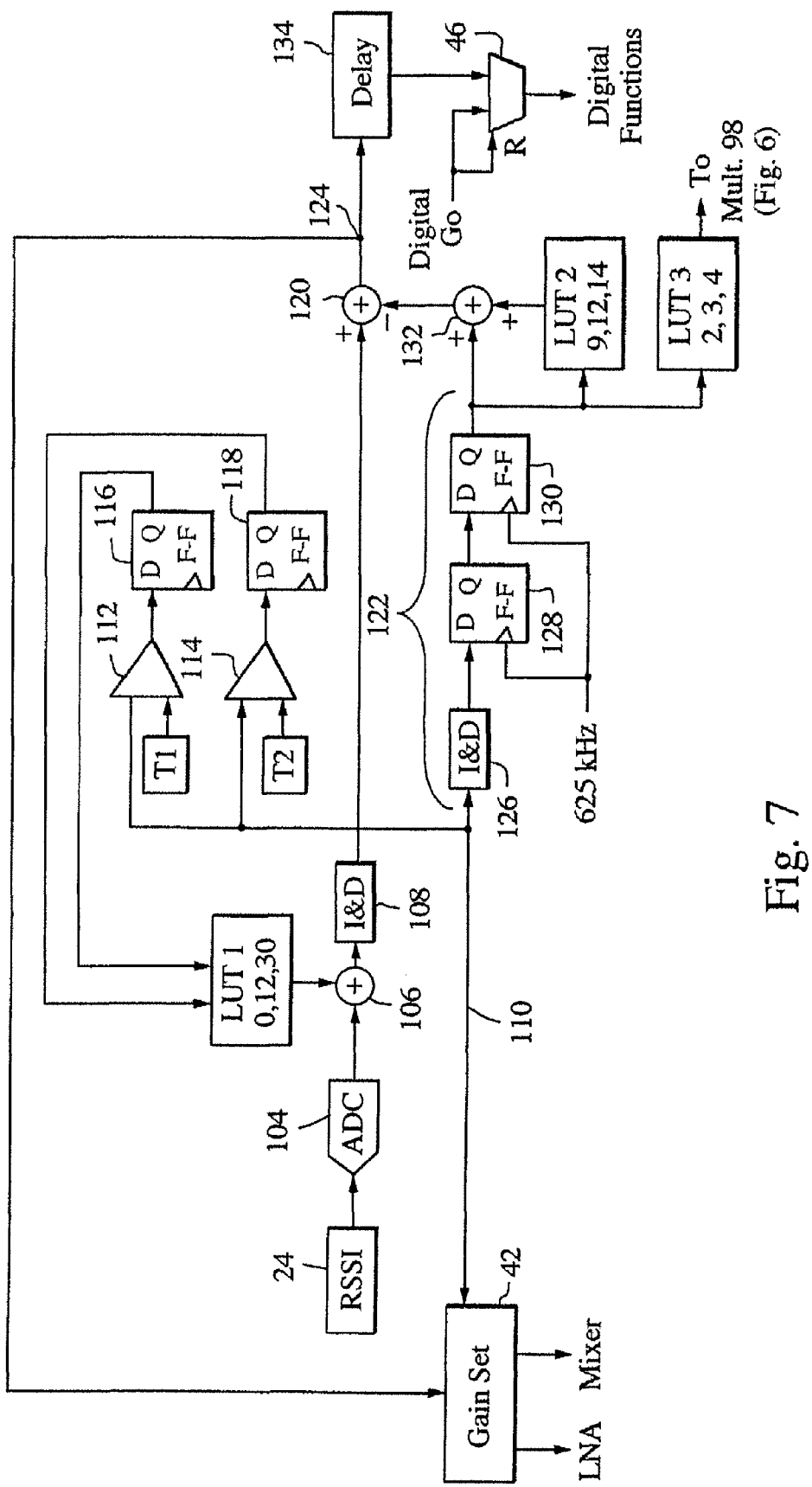
FIG. 7 is a schematic diagram of one embodiment for the analog GO generation circuitry and its use in enabling gain control functions within the receiver's analog gain control section, and digital demodulator functions in the digital demodulator section.

In accordance with a preferred embodiment of the invention, an analog GO circuit 40 detects the presence of a desired data packet signal at the output of RSSI 24 and, in response, enables a gain setting circuit 42 for the LNA 8 and mixer 10. GO circuit 40 is called "analog" because it responds to the analog RSSI output. However, as illustrated in FIG. 7, it can be implemented digitally, although an analog implementation is also possible if accompanied by a suitable analog/digital conversion where it interfaces with digital portions of the receiver circuitry. It is desirable that the LNA and mixer gain functions not be turned on until a desired data packet has been detected. In the presence of a relatively low level input, such as noise or an ACI or CCI, these elements are set at a high gain level, with the gain reduced in response to the reception of a high level input signal. This can lead to two problems. First, if the LNA turns on before a desired signal has arrived, it can amplify noise to the extent that the noise appears as a real desired data packet. Second, when a desired signal does arrive, a large overshoot occurs because the LNA has been set to a high gain and requires a finite time to reduce its gain in response to the desired signal.

The analog GO circuit 40 has a sensitivity that can successfully distinguish a desired data packet from both background noise and CCI, since noise is generally about 17 dB below the desired signal level, while CCI is approximately 11 dB below. However, the difference between ACI and the desired data packet signal level is generally only about 6 dB at the output of the polyphase bandpass filter 22 from which the RSSI 24 receives its input (adjacent channels are off set in frequency from the desired channel in 1 MHz increments). This is generally insufficient for the analog GO circuit 40 to distinguish a desired signal from ACI. The preferred embodiment of the invention employs a hybrid analog-digital approach to provide GO signals regardless of the nature of the inteferor. For purposes of this application, the term "circuit" is used to indicate both analog circuit components, and software that is used to implement digital functions.

The digital FIR filters 30 add an additional 20-30 dB of attenuation to the ACI signals. Thus, it is much easier to distinguish a desired signal from ACI at the input to the differential demodulator 32 than it is at the input to the RSSI 24. In accordance with the preferred embodiment of the invention, a digital GO circuit 44 is provided to recognize the presence of a desired data packet from the digital demodulator section, specifically from the outputs of the FIR filters 30. The primary function of the digital GO circuit 44 is to distinguish a valid data packet from ACI when the analog GO circuit 44 fails to make the distinction.

The outputs of the analog and digital GO circuits 40 and 44 are used to enable digital demodulator functions, specifically the phase rotator 34, STR 36 and logic state detection 38 function. Since these functions are not enabled in the absence of a GO signal, their designs can be simplified and made less expensive; they no longer have to take into account the transition between low level noise, CCI and ACI on the one hand, and a high level valid data packet on the other hand. The analog and digital GO outputs are applied as inputs to a multiplexer 46, which functions as an OR gate to supply enabling signals to the various digital demodulator section functions when either GO signal is present.

Figure 2A:
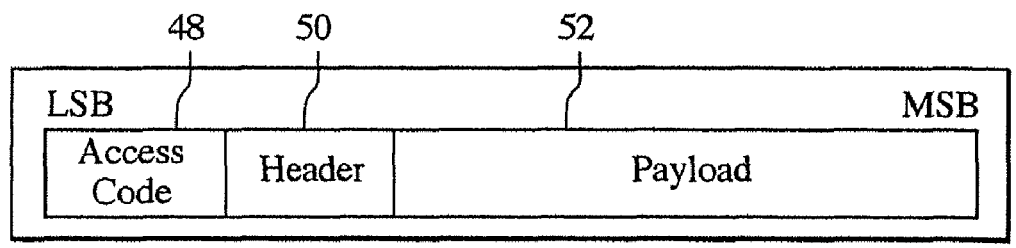
FIGS. 2a and 2b are diagrams illustrating a standard data packet format and its access code format, respectively, used in a Bluetooth wireless technology data packet.
Figure 2B:
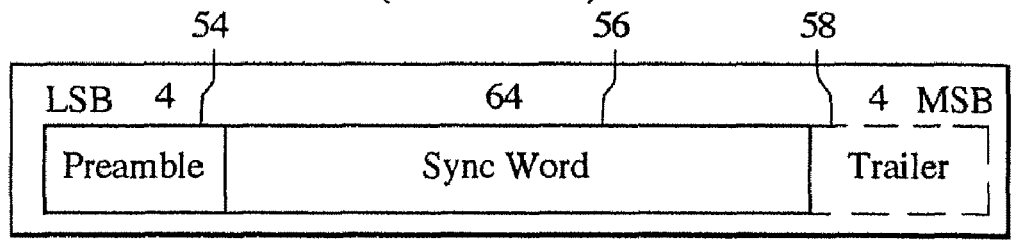

As mentioned previously, it is desirable that either GO circuit be capable of recognizing a valid data packet based only upon its short 4-bit preamble (5 bits when combined with the first bit in the synchronization word). A typical DFSK data packet that can be used to modulate the carrier signal in a Bluetooth system is illustrated in FIG. 2a. The packet typically has 625 bits, corresponding to a 625 µs data length. In reality, the effective Bluetooth wireless technology packet length is 366 µs, with the rest of the packet being dead time. The packet includes a 72 bit access code 48, a 54 bit header 50, with the remainder occupied by payload 52.

The access code 48 is illustrated in FIG. 2a. It consists of an initial 4-bit preamble 54, a 64-bit sync word 56 and an optional 4-bit trailer 58. The bit sequence of the preamble is (+1−1+1−1) or (−1+1−1+1), depending upon whether the first bit of the sync word is +1 or −1. In either case, the preamble consists of alternating +1s and −1s.

Figure 3:
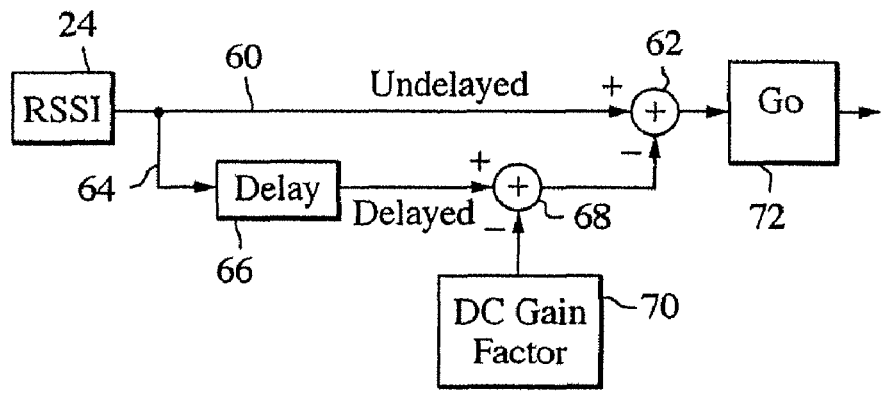
FIG. 3 is a block diagram conceptually illustrating the preferred analog GO generation circuitry.

FIG. 3 illustrates, on a somewhat conceptual level, the functioning of the analog GO circuit. The RSSI output is applied over a first path 60 to the positive input of a comparator 62, and over a second path 64 to the negative comparator input via a delay circuit 66 and a gain adjust circuit 68, with the amount of gain adjustment set by a DC gain factor input 70. The gain adjust circuit 68 provides an off set function that adjusts the differential in signal levels between the outputs of the delayed and undelayed signal paths.

The purpose of delay circuit 66 is to allow the comparator 62 to compare the current signal level (RSSI output level) on path 60 with the RSSI signal at a previous time determined by delay 66. If a valid data packet has arrived during the intervening time interval, the undelayed signal arriving on path 60 will be significantly higher than the delayed signal from path 64. The difference is used to produce a GO signal from a GO generator 72.

To guard against the production of spurious GO signals, the delayed signal is amplified by the DC gain factor 70. For example, if a gain factor of 4 is selected, the undelayed signal on path 60 must be at least 4 times greater than the delayed signal from path 64 before a GO signal will be generated.

Conceptually, the signals on both paths 60 and 64 could be delayed, as long as the delay along path 64 exceeds that along path 60. However, there will generally be no reason to intentionally add a delay to path 60.

To determine the arrival time of the desired data packet signal, the system should have a response that is quick enough to properly demodulate the envelope of the received signal. In the case of Bluetooth systems, the speed must be on the order of 2 µs. This sets the write time of the energy detect circuit illustrated in FIG. 3. The energy detect circuit can be either an analog detector responding to the power envelope of the received signal, such as the RSSI energy detect circuit as illustrated in FIG. 3, or a digital detector that responds to the energy of the received data bits in the digital demodulator section. The approach illustrated in FIG. 3 is applicable to both detection schemes.

To avoid errors caused by the finite rise time of the RSSI circuit, the delayed version of the signal could be compared to the undelayed version with a spacing of two symbols (data bits) between them. For example, the undelayed version of the signal can be integrated over the two symbol period labeled "undelayed", and the delayed version of the signal integrated over the 2 symbol period labeled "delayed". This allows the RSSI to rise over 2 µs and be at its peak when the signals are compared. The added delay requires extra pipeline delay to be added to the system, since it takes an extra 2 symbols to settle, and the "high" is 2 symbols wider.

The preferred circuit used to generate the digital GO signal is similar to that shown in FIG. 3. However, since the signal in the digital demodulator section is in quadrature format, the energy from both in-phase and quadrature components is combined for detection. Furthermore, the absolute value of the signal is taken in each path because the energy is no longer a power measurement, but a voltage measurement.

Figure 4:
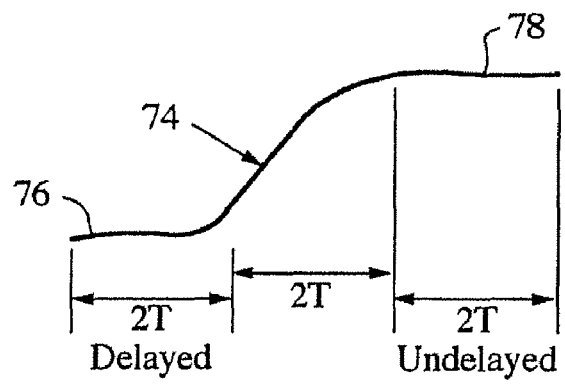
FIG. 4 is a graph illustrating a signal delay that can be employed to recognize a data packet preamble.

An example of the signal comparison that occurs when a valid data packet arrives is illustrated in FIG. 4. Curve 74 represents the RSSI output, which rises from a low level 76 prior to the receipt of the data packet, to a high level 78 corresponding to the data packet. The undelayed version of the signal 78 is integrated over the 2 symbol period labeled "undelayed", while the delayed version of the signal 76 is integrated over the 2 symbol period labeled "delayed", giving the RSSI enough time to rise to its peak level when the signals are compared.

The choice of the multiplier for DC gain factor 70 should also be considered. If the factor is too low, spurious GO signals may be produced. On the other hand, if it is too high it may fail to produce a GO signal when a valid data packet is received.

To determine the optimum gain factor, the circuit can be modeled mathematically by the equation:

$$y = x_1(t) - Mx_2(t),$$

where y is the output of comparator 62, $x_1(t)$ is the currently received signal, $x_2(t)$ is the delayed version of $x_1(t)$, $x_2(t) = x_1(t-nT)$, nT is the number of cycles of the sampling clock, and M is the gain factor multiplier. When the circuit is first activated, y will be a positive number until the delayed version of the signal teaches the adder 62 after nT sample. The subtracted delayed signal then begins having an effect, and the output settles to $(1-M) x_1(t)$. The desired signal then enters the circuit X times higher than the initial signal level. Thus, the output becomes $(1-M+X) x_1(t)$, until the desired signal's delayed version appears at the adder 62. The signal then settles to $(1-M+X-MX) x_1(t)$. From this a table can be generated to show the optimal values for M based upon SNR values X. An example of such a table is given in FIG. 5.

Figures 5, 6:
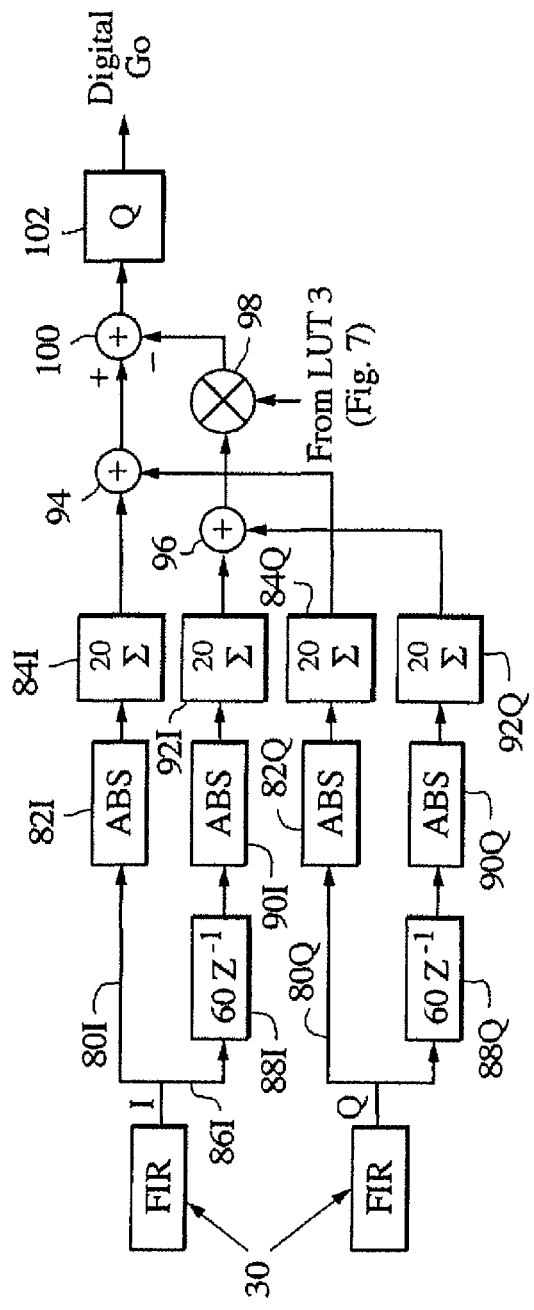
FIG. 5 is a table relating optimum values of a multiplier in an analog GO circuit to signal-to-noise ratio.
FIG. 6 is a block diagram of one embodiment for the digital GO generation circuit.

A block diagram of a preferred digital GO circuit 44 is given in FIG. 6. The output of the I FIR filter 30 is transmitted over an undelayed path 80I to an absolute value circuit 82I that obtains its absolute value, and then to an integrater 84I that integrates the value over 20 samples (at 5 samples per data packet bit). This same FIR I output is applied over a delay path 86I to a delay circuit 88I, the output of which is processed by an absolute value circuit 90I and delivered to another 20-sample integrater 92I. The output of the undelayed path is applied to an adder 94, while the output of the delayed path is applied to an adder 96. The delay in this embodiment was set at 60 data samples, rather than 20, because the variation in the synchronizer point in the low SNR case compared to the high SRN case was found to be greater than 20 samples. This was sufficient to cause incorrect DC offset correction and insufficient preamble bits for STR. Increasing the delay to 60 samples was found to reduce the variation to 10 samples, resulting in an improved bit error rate.

Similar undelayed and delayed paths are provided at the Q FIR filter output; the various elements are indicated by the same reference numbers as for the I output, followed by the letter Q. The undelayed I and Q integrated outputs are added together in adder 94, while the delayed I and Q integrated outputs are added together in adder 96. The delayed output of adder 96 is multiplied by a multiplication factor supplied from the analog GO circuit in multiplier 98, and the result is subtracted from the undelayed output of adder 94 in subtraction node 100. A decision circuit 102 produces a digital GO signal if the result is positive (the undelayed signal exceeds the delayed signal), but not otherwise.

A schematic diagram for one implementation of the analog GO circuit 40 is presented in FIG. 7. In this digital implementation, the output of RSSI 24 is digitized in an analog-to-digital converter 104. The output, having 0-79 digital values in a particular implementation, is used to adjust the gain of VGA 23, as indicated in FIG. 1. It also goes into a summer 106, where a representation of the LNA 8 and mixer 10 outputs are added to the RSSI value to provide an indication of the received signal strength at the input to the LNA 8.

The summed output is processed through an integrate-and-dump (I&D) circuit 108, which provides a gain scaling function by measuring the power in the window to provide an antenna-referred value at its output. The integration period for I&D 108 is long enough to inhibit false triggering of a GO from random noise, but short enough that the arrival of a valid data packet is not missed. It is assumed for this purpose that an interferor will be present for a longer period of time than random noise. In one particular embodiment, I&D 108 integrates over two 10 MHz samples to reduce the effective sampling rate to 5 MHz.

This output is used for several purposes. First, it is applied over line 110 to the gain set circuit 42 for the LNA 8 and mixer 10, and controls the turn-on level of these two gain elements. For example, with an RSSI digital output range of 0-79, the LNA and mixer could be commanded to turn on when the output of I&D 108 reaches 32 and 63, respectively.

The output of I&D 108 is referred to as the gain and signal strength (GASS) value, since it includes components from both the post-amplifier RSSI and from the LNA and mixer. It is also applied in a feedback loop to summer 106. In this loop, the GASS signal is applied to inputs of comparators 112 and 114, for which respective programmable threshold values T1 and T2 are established, with T1 representing the turn-on threshold for LNA 8, and T2 the turn on threshold for mixer 10.

The outputs of comparators 112 and 114 are connected to set respective flip-flop circuits 116 and 118, the outputs of which are applied to a look-up table LUT 1. LUT 1 outputs a preset value, depending upon whether LNA 8 and mixer 10 are on or off. In the illustrated example, LUT 1 produces a 0 output if neither the LNA or mixer is on, an output of 12 if only the LNA is on, and an output of 30 if both the LNA and mixer are on. This LUT output value is added to the digitized RSSI output in summer 106. LUT 1 dynamically sets a threshold for production of the analog GO signal, based upon the GASS power measurement. This allows for a more time consistent energy detection response.

The GASS signal is also applied directly to another summing node 120 without intentional delay, and through a delay circuit 122 to a negative input to the same summing node 120. The purpose of subtracting the delayed version of the GASS signal from the undelayed version is to determine whether a valid data packet has arrived during the time interval between the two signals, as explained in connection with FIG. 3. If the comparison is positive, indicating that a valid data packet has arrived, an analog GO signal is produced on node 124 at the output of summer 120.

The delay path 122 is illustrated as another I&D circuit 126, which in this example spans 8 samples to lower the sampling rate to 625 kHz. This is convenient to implement a 3 symbol delay by delaying the I&D 126 output by two 625 kHz samples, which is accomplished in series flip-flops 128 and 130, both clocked at a 625 kHz rate.

The delayed GASS is added to one of three values from a look-up table LUT 2 in summer 132. The addition effectively performs a multiplication by 3, 4 or 5 by adding values of 9, 12 or 14, respectively. This is due to the fact that the RSSI output is a logarithmic representation of the input power. LUT 2 is used to establish a threshold for initiation of an analog GO signal.

The LUT 2 multiplier is chosen based upon the residual level of the receiver's input signal, which is the level of the input signal before the desired signal arrives. For optimum performance of the energy detection function, a larger multiplier is used for the sensitivity case (i.e., low residual input signal level), while a smaller multiplier is used for the co-channel interference case. By modifying the multiplier based upon the residual signal level, better immunity to noise can be achieved. At threshold, the residual signal will be dominated by noise, which has a higher peak factor and, hence, a higher chance of false detects. When the cochannel interferer is present, it dominates the noise environment with a limited peak factor, and thus the chance of false detections is less.

The multiplier (adder) value from LUT 2 is added to the delayed GASS, and the sum is then subtracted from the undelayed GASS in summer 120. When the sum exceeds a (serial port programmable) threshold, nominally zero, an analog GO signal is generated. In a similar fashion, another look-up table LUT 3 receives the same delayed GASS as LUT 2, and provides the multiplication factor for multiplier 98 in the digital GO circuit (FIG. 6), which in turn sets the factor by which the undelayed signal must exceed the delayed signal to produce a digital GO.

An analog GO signal on node 124 is supplied to the gain set circuit 42 for LNA 8 and mixer 10 to set the gain of these elements. It should be recalled that the LNA and mixer are set to maximum gain prior to turn-on. Once turned on, their gain values are progressively reduced as the GASS value on line 110 increases.

The analog GO signal on node 124 is also sent through a delay circuit 134 to the multiplexer 46. As described in connection with FIG. 1, the multiplexer supplies enabling signals to the various digital demodulator section functions, such as the phase rotator 34, STR 36 and logic state detect 38, in response to either an analog or a digital GO signal.

An analog GO signal will be produced at node 124 prior to the production of a digital GO signal by the digital GO circuit 44, due to pipeline delays in the receiver. The delay circuit 134 is programmable to enable synchronization of the GO signal with the received data packet. In this particular example, it can be set at a delay value within the range of 2-40 ms, depending upon the measured pipeline delay.

One of the digital functions enabled by either an analog or digital GO signal is the STR circuit 36. As mentioned previously, the Bluetooth standard is a burst type transmission system, with only one synchronization word transmitted per burst. The sync word can be either (1, 0, 1, 0) or (0, 1, 0, 1). In accordance with the invention, a single shot best estimate of the clock phase is used in an effort to synchronize the selection of a sample used to represent an incoming symbol with the maximum strength of that symbol. The scheme has to be robust since the data burst is short and the very first symbol of the Bluetooth data packet is the beginning of the sync word.

Figure 8:
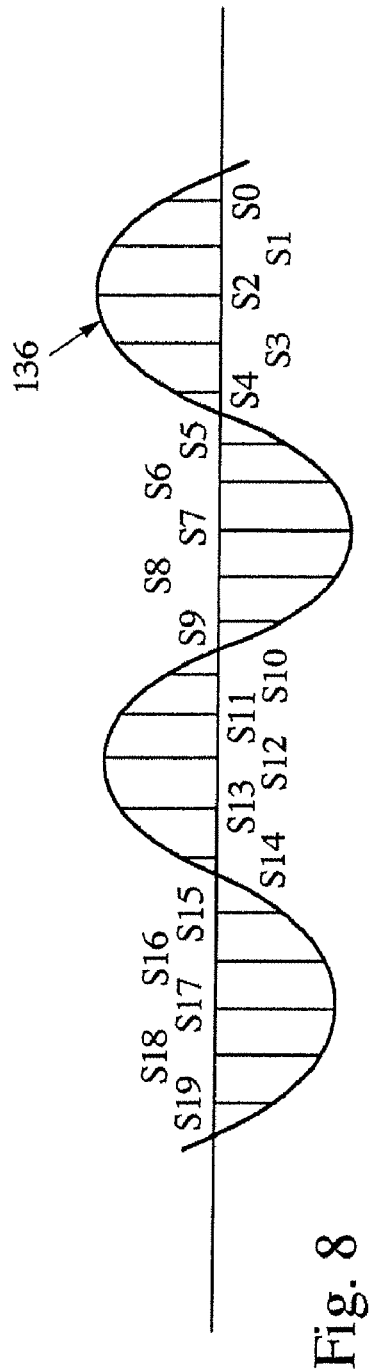
FIG. 8 is a graph illustrating an input signal to the STR circuit.
Figure 9:
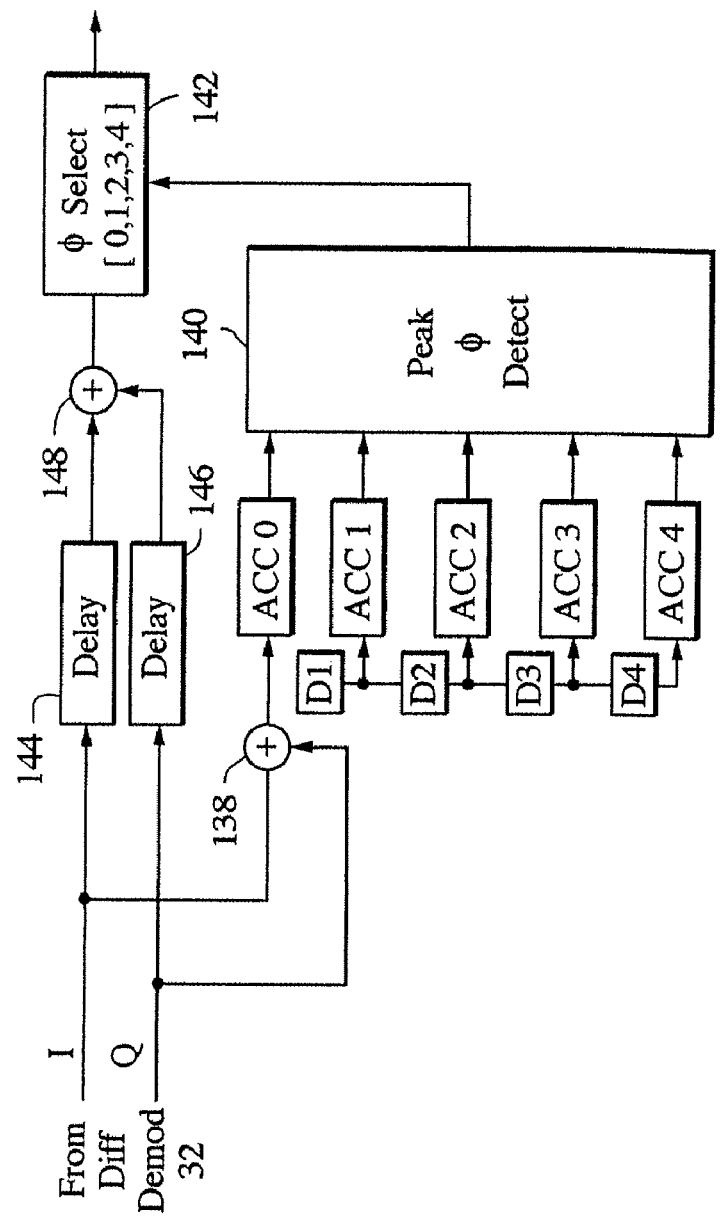
FIG. 9 is a block diagram of an STR circuit employed in one embodiment.

A representation of an incoming signal to the STR circuit is given in FIG. 8 for purposes of discussion while a block diagram of the SDR circuit itself is provided in FIG. 9. Referring first to FIG. 8, an incoming signal 136 is represented by successive samples, with the sample rate greater than the symbol (bit) rate. In this particular example, each symbol is sampled five times, with the first symbol represented by samples S0, S1, S2, S3, S4, the second symbol by samples S5, S6, S7, S8, S9, etc. The overall receiver can be simplified if the portion downstream from the STR circuit operates on the basis of only one sample per symbol. For highest accuracy, a sample that occurs at or near the symbol's maximum value should be selected. Otherwise, the selected sample may be below the threshold between a digital "0" and "1", and the bit will be missed.

Once a particular sample location has been identified as corresponding to the maximum symbol value, the same sample location is used for all remaining symbols in the data packet. In the example of FIG. 8, S2 and S7 are located closest to the symbol maxima. Accordingly, the same order signal (S12, S17, S22, S27, S32, etc.) is employed in the logic state detect circuit 38 to decode the remainder of the data packet.

The STR circuit of FIG. 9 uses the first 5 symbols to effect symbol timing recovery. Although the Bluetooth standard has only a 4 symbol preamble, the 5$^{th}$ bit of the data packet is always opposite in phase to the 4$^{th}$ bit. Thus, the 2 valid preambles (+1−1+1−1) or (−1+1−1+1) can be modified to (+1−1+1−1+1) or (−1+1−1+1−1). The 5$^{th}$ bit can be used if the 1$^{st}$ bit is lost due to the ramping up phase of the RSSI.

The STR circuit concludes 5 accumulator/correlator blocks labeled ACC0, ACC1, ACC2, ACC3 and ACC4. The inphase and quadrature components of the differential demodulator 32 output are added together in a summer 138, after compensation for frequency offsets by the phase rotation circuitry 34 (FIG. 1), and supply to the accumulator/correlators, each of which is programmed with the (+1−1+1−1) Bluetooth preamble pattern. Successive delays D1, D2, D3, D4 are inserted into the connection line after each successive accumulator/correlator, so that each one holds a set of samples that are delayed by 1 sample period compared to the samples held by the immediately preceding accumulator/correlator. For example, when ACC0 holds samples S0, S5, S10 and S15, ACC1 will hold S1, S6, S11 and S16, ACC2 will hold S2, S7, S12 and S17, ACC3 will hold S3, S8, S13 and S18, while ACC4 will hold S4, S9, S14 and S19.

Each accumulator/correlator cross-correlates the incoming signal which it holds at any given clock cycle to the known preamble data pattern which it stores, and accumulates the result. The computations are as follows:

$$<ACC\ 0>=+S0-S5+S10-S15$$

$$<ACC\ 1>=+S1-S6+S11-S16$$

$$<ACC\ 2>=+S2-S7+S12-S17$$

$$<ACC\ 3>=+S3-S8+S13-S18$$

$$<ACC\ 4>=+S4-S9+S14-S19$$

Once samples from 4 successive symbols have been accumulated, the 5 results are compared in peak phase detection circuit 140. Whichever accumulator/correlator is found to store the highest absolute value is considered to be the one holding the sample points closest to the symbol maximum; the absolute value is used because a valid preamble can be (−1+1−1+1) rather than (+1−1+1−1). The result is transmitted to a phase like circuit 142, which selects either the 0, 1, 2, 3 or 4 sample order for all of the symbols in the remainder of the data packet, and no further timing correction is done.

It requires 20 cycles, or 4 symbol periods, for the accumulator correlators to compute their sums, and an additional 4 cycles to compare each result and determine which accumulator correlator is storing the maximum value. Once the correct sampling instant has been chosen, the receiver reduces computations to one sample per symbol in the logic state detect circuit 38.

To compensate for the pipeline delay in the STR section, the I and Q inputs from the differential demodulator are subjected to equal delays in delay blocks 144 and 146, respectively, before being combined in summer 148 for application to the phase select circuit 142. A frequency offset phase correction similar to that at the inputs to summer 138 is also applied to the inputs to summer 148.

The resulting receiver has an improved ability to recognize the presence of a received data packet in the presence of various types of interferors, enhances the processing of true data packet signals, and increases the decoding efficiency.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A radio frequency (RF) receiver having an analog gain control section for controlling the gain of a received RF signal, and a digital demodulator section for demodulating the output of the gain control section, the RF receiver comprising:
    an analog GO circuit connected to recognize the presence of a data packet within a received RF signal in the analog gain control section, and in response to produce an analog GO signal,
    a digital GO circuit connected to recognize the presence of a data packet within the received RF signal from the digital demodulator section, and in response to produce a digital GO signal, and control circuitry connected to enable gain control functions within the analog gain control section and digital demodulator functions within the digital demodulator section in response to respective analog and digital GO signals indicating that a data packet is present within the received RF signal, and disable the gain control functions when no data packet is present.

2. The RF receiver of claim 1 in which the analog GO circuit distinguishes a data packet against at least one of background noise or co-channel interference.

3. The RF receiver of claim 1 in which the digital GO circuit distinguishes a data packet against adjacent channel interference.

4. The RF receiver of claim 1 in which the analog GO circuit compares an analog signal with a delayed version of the analog signal to recognize the presence of a data packet.

5. The RF receiver of claim 4 in which the analog GO circuit compares a received signal strength indicator (RSSI) with a delayed version of the RSSI to recognize the presence of a data packet.

6. The RF receiver of claim 1 in which the control circuitry enables gain functions of at least one of a low noise amplifier (LNA) or a mixer in response to a first state of the analog GO signal and disables the gain functions of the at least one of the LNA or mixer in response to a second state of the analog GO signal.

7. The RF receiver of claim 6 in which the LNA or mixer is upstream of a received signal strength indicator (RSSI) circuit.

8. A radio frequency (RF) receiver that includes gain control circuitry connected to control the gain of a received RF signal, an analog-to-digital converter (ADC) connected to produce a digitized output from the gain control circuitry, and a digital demodulator section for demodulating the output of the ADC, the RF receiver comprising:
a pair of propagation paths connected to impart different delays to the digitized output, and
a digital GO signal generator connected to produce a digital GO signal in response to the difference between the delayed signals exceeding a predefined threshold level and not produce the digital GO signal in response to the difference between the delayed signals not exceeding the predefined threshold level, the digital GO signal being employed to enable digital demodulator functions within the digital demodulator section.

9. The RF receiver of claim 8, further comprising at least one FIR filter connected prior to the propagation paths to attenuate adjacent channel interference in the digitized output.

10. The RF receiver of claim 9, wherein the propagation paths include both in-phase and quadrature components.

11. The RF receiver of claim 8, wherein one of the propagation paths imparts a zero intentional delay.

12. The RF receiver of claim 8 in which the pair of propagation paths impart different delays to the in-phase component of the digitized output, and the digital GO signal generator produces the digital GO signal in response to the difference exceeding the threshold level, the difference including a component representing a difference between the delayed in-phase components of the digitized output.

13. The RF receiver of claim 8 in which the pair of propagation paths impart different delays to the quadrature component of the digitized output, and the digital GO signal generator produces the digital GO signal in response to the difference exceeding the threshold level, the difference including a component representing a difference between the delayed quadrature components of the digitized output.

14. A radio frequency (RF) receiver for RF data packets having a preamble with a defined bit pattern, the receiver including circuitry for converting a received RF signal to digital format with a sample rate greater than the data packet bit rate, and circuitry for recognizing the preamble of a received data packet, the receiver comprising:
a symbol timing recovery (STR) circuit that identifies periodic samples of the preamble of a received data packet that are spaced by the bit period and most closely match a known preamble data pattern, the STR circuit including a plurality of accumulators, each accumulator storing a set of samples that are delayed by one sample period compared to the samples stored by the immediately preceding accumulator, and within the set of samples stored in the accumulator, each sample and a subsequent sample are spaced apart by the bit period, each accumulator being programmed to cross-correlate the stored set of samples of the preamble with the known preamble data pattern,
the receiver employing a continuation of the identified periodic samples to decode the remainder of the data packet.

15. The RF receiver of claim 14, wherein the STR circuit is enabled in response to the recognition of the preamble of a received data packet.

16. The RF receiver of claim 14, wherein the STR circuit is configured to delay the received data to compensate pipeline delays in the RF receiver.

17. The RF receiver of claim 14, wherein the STR circuit uses an extra bit in addition to the preamble bits to compensate signal loss.

18. The RF receiver of claim 14 in which the first accumulator stores a first set of periodic samples and the second accumulator stores a second set of periodic samples, the first set of periodic samples comprises a first sample and a second sample that are spaced by the bit period, the second set of periodic samples comprises a first sample and a second sample that are spaced by the bit period, the first sample of the first group and the first sample of the second group are spaced by the sample period, and the second sample of the first group and the second sample of the second group are spaced by the sample period.

19. A method of receiving a data packet within a received radio frequency (RF) signal, in an RF receiver that includes an analog gain control section for controlling the gain of a received RF signal, the analog gain control section having a first amplifier that amplifies the RF signal and a second amplifier that amplifies an intermediate frequency signal derived from the RF signal, and a digital demodulator section for demodulating the output of the gain control section, the method comprising:
enabling gain control functions of the first amplifier within the analog gain control section in response to the recognition of a data packet in the gain control section,
disabling the gain control functions of the first amplifier such that the first amplifier does not amplify the RF signal in response to no recognition of a data packet in the gain control section, in which the un-amplified RF signal that passes the first amplifier is analyzed to determine whether a data packet is received, and
enabling digital demodulator functions within the digital demodulator section in response to the recognition of a data packet in the digital demodulator section.

20. The method of claim 19 in which the recognition of a data packet in the gain control section comprises distinguishing a data packet against at least one of background noise or co-channel interference.

21. The method of claim 19 in which the recognition of a data packet in the digital demodulator section comprises distinguishing a data packet against adjacent channel interference.

22. The method of claim 19, comprising comparing an analog signal with a delayed version of the analog signal to recognize a presence of a data packet in the analog gain control section.

23. The method of claim 22 in which comparing an analog signal with a delayed version of the analog signal comprises comparing a received signal strength indicator (RSSI) with a delayed version of the RSSI to recognize a presence of a data packet in the analog gain control section.

24. The method of claim 19 in which enabling and disabling gain control functions comprises enabling gain control functions of at least one of a low noise amplifier (LNA) or a mixer in response to a first state of an analog GO signal and disabling the gain control functions of the at least one of the LNA or mixer in response to a second state of the analog GO signal.

25. The method of claim 24 in which the LNA or mixer is upstream of a received signal strength indicator (RSSI) circuit.

26. The method of claim 19 in which the analog gain control section has a sensitivity sufficient to distinguish a data packet against co-channel interference but insufficient to distinguish a data packet against adjacent channel interference, and the digital demodulator section has a sensitivity sufficient to distinguish a data packet against adjacent channel interference.

27. A radio frequency (RF) receiver comprising:
a first circuit to receive and amplify an RF signal;
a second circuit to distinguish a data packet against a first noise signal within the received RF signal by sensing the power of the data packet, and to produce an analog GO signal that is fed back to adjust gain functions of the first circuit, the second circuit enabling the gain functions of the first circuit in response to the analog GO signal indicating that a data packet has been detected, the second circuit disabling the gain functions of the first circuit when no data packet has been detected;
a third circuit to receive the analog GO signal to distinguish the data packet against a second noise signal within the received RF signal by sensing the energy of the data packet, and in response to produce a digital GO signal; and
a fourth circuit to demodulate the data package based on the generated analog GO signal and digital GO signal.

28. The RF receiver of claim 27 wherein the first noise signal comprises at least one of background noise or co-channel interference.

29. The RF receiver of claim 27 wherein the second noise signal comprises adjacent channel interference.

30. The RF receiver of claim 27 wherein the second circuit comprises an integrate-and-dump (I&D) circuit comprising:
an input to receive data in digital domain;
an integrator connected to the input to integrate received data; and
an output connected to the integrator to produce a gain and signal strength (GASS) value.

31. The RF receiver of claim 30 wherein the GASS value is configured to:

enable and adjust the first circuit to receive and amplify an RF signal;
apply to a first propagation path imparting a zero intentional delay and provide an undelayed signal; and
apply to a second propagation path imparting a time delay and produce a delayed signal.

32. The RF receiver of claim 30 wherein the second circuit comprises circuitry to dynamically set a threshold for production of the analog GO signal based on power measurement of the GASS value.

33. The RF receiver of claim 31 wherein the second circuit comprises subtraction means connected to the output of the first propagation path and the second propagation path for subtracting the delayed signal from the undelayed signal to determine a valid data package.

34. The RF receiver of claim 27 wherein the analog GO signal is produced prior to production of the digital GO signal.

35. The RF receiver of claim 31 wherein the time delay is determined based on pipeline delays in the receiver.

36. The RF receiver of claim 27 in which the second circuit compares an analog signal with a delayed version of the analog signal to distinguish a data packet against a first noise signal.

37. The RF receiver of claim 36 in which the second circuit compares a received signal strength indicator (RSSI) with a delayed version of the RSSI to distinguish a data packet against a first noise signal.

38. The RF receiver of claim 27 in which the first circuit comprises a low noise amplifier (LNA).

39. The RF receiver of claim 38 in which the LNA is upstream of a received signal strength indicator (RSSI) circuit.

40. A radio frequency (RF) receiver comprising:
an analog GO circuit to recognize the presence of a data packet within a received RF signal in an analog gain control section that controls the gain of the received RF signal, and in response to produce an analog GO signal, the analog GO circuit distinguishing the data packet from background noise and co-channel interference;
a digital GO circuit to recognize the presence of a data packet within the received RF signal from a digital demodulator section for demodulating the output of the gain control section, and in response to produce a digital GO signal, the digital GO circuit distinguishing the data packet from adjacent channel interference; and
control circuitry to enable gain control functions within the analog gain control section and digital demodulator functions within the digital demodulator section in response to respective analog and digital GO signals.

41. The RF receiver of claim 40 in which the analog gain control section comprise at least one of a low noise amplifier (LNA) or a mixer, and the control circuitry enables gain control functions of the LNA or mixer in response to a first state of the analog GO signal and disables the gain control functions of the LNA or mixer in response to a second state of the analog GO signal.

42. A method of receiving a data packet within a received radio frequency (RF) signal, in an RF receiver that includes an analog gain control section for controlling the gain of a received RF signal, the analog gain control section having a first amplifier that amplifies the RF signal and a second amplifier that amplifies an intermediate frequency signal derived from the RF signal, and a digital demodulator section for demodulating the output of the gain control section, the method comprising:

enabling gain control functions of the first amplifier within the analog gain control section in response to the recognition of a data packet in the gain control section, disabling the gain control functions of the first amplifier in response to no recognition of a data packet in the gain control section, enabling digital demodulator functions within the digital demodulator section in response to the recognition of a data packet in the digital demodulator section, and comparing an analog signal with a delayed version of the analog signal to recognize a presence of a data packet in the analog gain control section.

43. The method of claim 42 in which comparing an analog signal with a delayed version of the analog signal comprises comparing a received signal strength indicator (RSSI) with a delayed version of the RSSI to recognize a presence of a data packet in the analog gain control section.

* * * * *

UNITED STATES PATENT AND TRADEMARK OFFICE
CERTIFICATE OF CORRECTION

| | | |
|---|---|---|
| PATENT NO. | : 8,238,494 B2 | Page 1 of 1 |
| APPLICATION NO. | : 12/264403 | |
| DATED | : August 7, 2012 | |
| INVENTOR(S) | : Phillip M. Sher | |

It is certified that error appears in the above-identified patent and that said Letters Patent is hereby corrected as shown below:

On the title page item (75) Inventors: line 2, delete "Emakulam" and insert -- Ernakulam --.

Signed and Sealed this

Thirteenth Day of November, 2012

David J. Kappos
*Director of the United States Patent and Trademark Office*